US008626868B2

(12) United States Patent
Wang

(10) Patent No.: US 8,626,868 B2
(45) Date of Patent: Jan. 7, 2014

(54) COMMUNICATION METHOD AND COMMUNICATION DEVICE FOR TRANSMITTING MULTIMEDIA DATA DURING A CALL

(75) Inventor: Xin Wang, Shanghai (CN)

(73) Assignee: Alcatel Lucent, Paris (FR)

( * ) Notice: Subject to any disclaimer, the term of this patent is extended or adjusted under 35 U.S.C. 154(b) by 538 days.

(21) Appl. No.: 12/735,397

(22) PCT Filed: Jan. 15, 2008

(86) PCT No.: PCT/CN2008/000097
§ 371 (c)(1),
(2), (4) Date: Sep. 10, 2010

(87) PCT Pub. No.: WO2009/089648
PCT Pub. Date: Jul. 23, 2009

(65) Prior Publication Data
US 2011/0047241 A1    Feb. 24, 2011

(51) Int. Cl.
*G06F 15/16* (2006.01)
(52) U.S. Cl.
USPC ............................ 709/217; 709/218; 709/219
(58) Field of Classification Search
USPC .................................................. 709/217–219
See application file for complete search history.

(56) References Cited

U.S. PATENT DOCUMENTS

| 7,774,009 | B2* | 8/2010 | Choi ............................. 455/518 |
| 8,090,366 | B2* | 1/2012 | McNamara et al. .......... 455/424 |
| 8,125,507 | B2* | 2/2012 | Ryu et al. ................... 348/14.02 |
| 2006/0033809 | A1* | 2/2006 | Farley ........................ 348/14.01 |
| 2006/0193448 | A1* | 8/2006 | Donoghue et al. ........... 379/67.1 |
| 2006/0211455 | A1* | 9/2006 | Choi ............................. 455/567 |
| 2007/0019631 | A1* | 1/2007 | Jang ............................. 370/352 |
| 2007/0070182 | A1* | 3/2007 | Ryu et al. ................... 348/14.02 |
| 2007/0126859 | A1* | 6/2007 | Choi et al. ................. 348/14.02 |
| 2007/0291733 | A1* | 12/2007 | Doran et al. ................. 370/352 |
| 2008/0096544 | A1* | 4/2008 | McNamara et al. .......... 455/424 |
| 2008/0146256 | A1* | 6/2008 | Hawkins et al. ............. 455/466 |
| 2008/0261564 | A1* | 10/2008 | Logan ......................... 455/413 |
| 2009/0181659 | A1* | 7/2009 | Stalnacke et al. ............. 455/416 |

* cited by examiner

*Primary Examiner* — Mohamed Wasel
(74) *Attorney, Agent, or Firm* — Carmen Patti Law Group, LLC

(57) ABSTRACT

A method and apparatus are provided for transmitting multimedia data between terminals during a call. In response to a request for multimedia data transmission initiated from one of the terminals in the call, a communication device may transmit the multimedia data to one or more of the terminals in the call. The communication device may comprise a reception unit for receiving the multimedia data transmission request initiated from one of the terminals in the call, a transmission unit to transmit the multimedia data to one or more of the terminals in the call, a storage unit to store multimedia data, and a recording unit to record information for a terminal.

15 Claims, 3 Drawing Sheets

COMMUNICATION METHOD AND COMMUNICATION DEVICE FOR TRANSMITTING MULTIMEDIA DATA DURING A CALL

FIELD OF THE INVENTION

The present invention generally relates to the field of communication technologies, and more particularly, to a communication method and communication device for transmitting multimedia data during a call.

BACKGROUND OF THE INVENTION

With the improvement of data processing capability of communication platforms, in recent decades have seen a considerable growth in the number of communication applications, such as short messages, phone books, games, photo graphing, multimedia players and so on. It is believed that the high-speed transfer of data across the communication network will be put into extensive applications with the development of various communication standards (e.g., SIP, GPRS, UMTS, CDMA, WAP, HSDPA).

During communication, especially during a call, once a subscriber wants to play a multimedia data file (e.g., audio, picture or video data file stored in jpg, mp3, avi, wmv, rm, mpeg format) to the other subscriber of the call, how to transmit the multimedia data during the call, i.e. how to insert the multimedia data into the call is a problem.

According to existing technical solutions, all multimedia data transmission resources are occupied at the beginning of a call and are then released at the end of the call, so that a large amount of resources are wasted when no multimedia data is being transmitted. Additionally, when subscribers wish to store more multimedia data for subsequent multimedia data transmission, more and more storage space will be consumed. Thus, the subscribers might have to lower the quality of picture, audio or vide data files by using high rate compression, so as to accommodate more data files.

SUMMARY OF THE INVENTION

In view of the problems described above, the present invention provides a communication method and communication device for transmitting multimedia data during a call.

According to a first aspect of the present invention, there is provided a communication method for transmitting multimedia data during a call between terminals. The method can comprise the steps: receiving a multimedia data transmission request initiated from one of the terminals in the call; and responsive to the request, transmitting the multimedia data to one or more of the terminals in the call.

According to a second aspect of the present invention, there is provided a communication device for transmitting multimedia data during a call between terminals. The communication device can comprise: a reception unit for receiving a multimedia data transmission request initiated from one of the terminals in the call; and a transmission unit for, responsive to the request, transmitting the multimedia data to one or more of the terminals in the call.

Other features and advantages of the present invention will become apparent from the following description of embodiments illustrating the principles of the present invention, when taken in conjunction with the accompanying drawings.

BRIEF DESCRIPTION OF THE DRAWING

As the present invention is better understood, other objects and effects of the present invention will become more apparent and easy to understand from the following description, taken in conjunction with the accompanying drawings wherein.

In all the above drawings, the reference numbers represent identical, like or corresponding features or functions.

DESCRIPTION OF THE PREFERRED EMBODIMENT

The main principle of the present invention is to transmit multimedia data to one or more terminals during a call upon request of a terminal while two or more terminals are in the call.

Hereinafter, embodiments of the present invention will be described with reference to the accompanying drawings.

Figure 1:
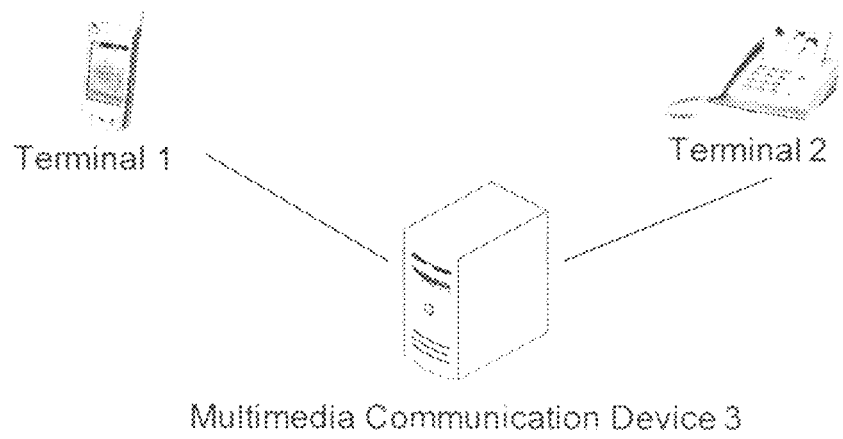
FIG. 1 is a schematic view illustrating communication process of transmitting multimedia data to terminals during a call according to the present invention.

FIG. 1 is a schematic view of communication process of transmitting multimedia data to a terminal during a call according to the present invention. As shown in FIG. 1, terminal 1 and terminal 2 are in a call. At this point, if terminal 1 intends to transmit specific multimedia data (e.g. audio, video, picture files or a combination thereof) to terminal 2 and/or itself, then terminal 1 can send a multimedia data transmission request to a multimedia communication device 3 of the present invention.

Next, the communication device (e.g. multimedia communication device 3 shown in FIG. 1) can learn terminal 1 intends to transmit what multimedia data to which terminal in the call, by analyzing the request. For example, terminal 1 wishes to transmit the song "moonriver.mp3" to terminal 1 itself and terminal 2 in the call.

Then, multimedia communication device 3 can search for the requested multimedia data, e.g. the song "moonriver.mp3," among multimedia data pre-stored in its storage unit and then transmit the found multimedia data to terminals 1 and 2.

Afterwards, terminals 1 and 2 may play by multimedia players provided with themselves the multimedia data received from multimedia communication device 3, while terminals 1 and 2 remain in the call state. In this way, subscribers to terminals 1 and 2 can listen to the song, watch video, appreciate pictures, or the like at the same time.

According to the present invention, multimedia communication device 3 may provide multimedia data transmission service. The term "multimedia transmission service" means that responsive to a terminal's request, multimedia communication device 3 transmits desired multimedia data to this terminal and/or the other terminal which is in a call with this terminal. For the multimedia transmission service, terminals may be registered to multimedia communication device 3 in advance. For example, when multimedia communication device 3 allows the providing of multimedia data transmission service to a terminal, on a terminal service record table stored on multimedia communication device 3 is recorded that multimedia data transmission service is enabled for this terminal.

Further, according to the present invention, in multimedia communication device 3 is also stored "receive enabled/disabled" information indicating whether a terminal agrees to receive multimedia data transmitted from multimedia communication device 3. For the "receive enabled/disabled" information, a terminal is also registered to multimedia communication device 3 in advance. For example, if a terminal agrees to receive multimedia data transmitted from multimedia communication device 3, then the "receive enabled/disabled" information in the terminal service record table is set as "enabled."

FIG. 1 shows an example of the terminal service record table on multimedia communication device 3. As indicated in line 2, column 3 of Table 1, for terminal 1 with an address of 870001, "multimedia data transmission service" information is set as "enabled" on multimedia communication device 3. This means that multimedia communication device 3 may, in response to a request of terminal 1, transmit desired multimedia data to terminal 1 and/or the other terminal which is in a call with terminal 1. Additionally, as indicated in line 2, column 4 of Table 1, for terminal 1 with an address of 870001, "receive enabled/disabled" information is set as "enabled", which means that terminal 1 agrees to receive multimedia data. Likewise, as is clear from line 3 of Table 1, multimedia data transmission service is not enabled for terminal 2 with an address of 8700002, whereas terminal 2 can receive multimedia data transmitted from the multimedia communication device.

TABLE 1

| Address of terminal | Name of terminal | Multimedia data transmission service | Receive enabled/disabled |
|---|---|---|---|
| 8700001 | Terminal 1 | enabled | enabled |
| 8700002 | Terminal 2 | disabled | enabled |
| ... | ... | ... | ... |

In the present invention, transmitted multimedia data is stored in a storage unit in multimedia communication device 3. The multimedia data may be pre-stored, provided by terminals, or provided by service providers. For example, when terminals are mobile phones, multimedia data is transferred via WAP to multimedia communication device 3 of the present invention. When terminals are personal computers, multimedia data is transferred to multimedia communication device 3 by HTTP, FTP or the like via a web server. In this manner, multimedia data stored in multimedia communication device 3 can be updated and managed by various means.

Figure 2:
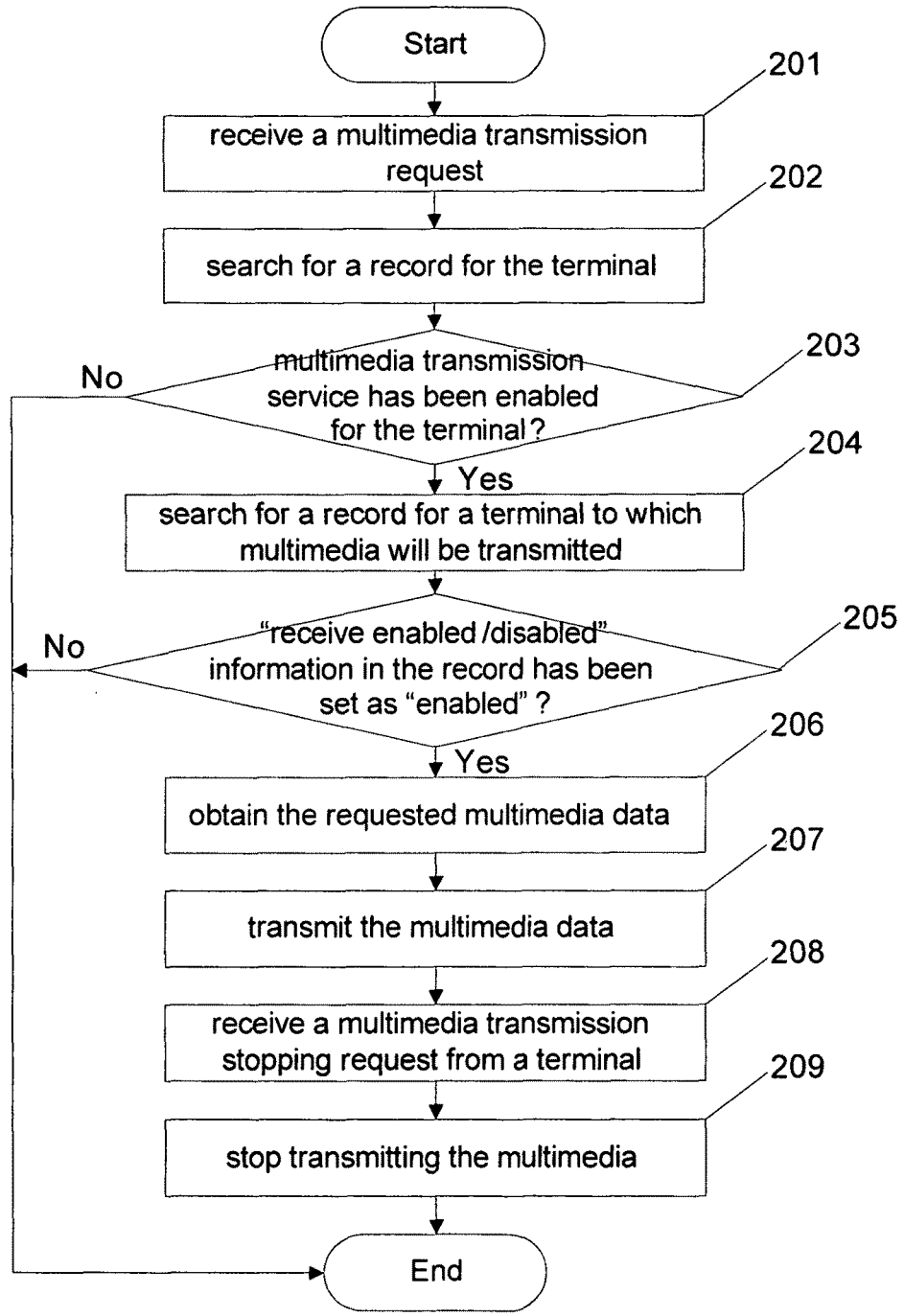
FIG. 2 is a flowchart of a communication method according to an embodiment of the present invention.

FIG. 2 is a flowchart of a communication method according to an embodiment of the present invention. In this embodiment, terminal 1 and terminal 2 are in a call. Terminal 1 sends to multimedia communication device 3 a multimedia data transmission request for the transmission of multimedia data to terminal 2 and terminal 1 itself. When it is determined that multimedia data transmission service has been enabled for terminal 1, and "receive enabled/disabled" information is set as "enabled" for terminals 1 and 2, multimedia data is transmitted. When multimedia data is being transmitted during the call, terminals 1 and 2 can keep the call without interruption. During the transmission of multimedia data, the terminal receiving the multimedia data can make a request for stopping the multimedia data transmission.

The communication method according to an embodiment of the present invention will be described in detail with reference to FIG. 2 below.

First, in step 201, multimedia communication device 3 receives a multimedia data transmission request initiated from a terminal in a call. According to the present invention, terminal 1 may request multimedia communication device 3 to transmit desired multimedia data to one or more terminals in a call. For example, the multimedia data transmission request may include names of terminals to which terminal 1 wants to transmit multimedia data.

Specifically, where terminal 1 initiates a multimedia data transmission request, it may send a message containing the requested content to a specific number associated with multimedia communication device 3 in various manners (e.g. through SIP INFO etc).

An example of a SIP INFO message is illustrated below:

```
INFO sip:imsnetwork.enterprise.com:5060;user=phone SIP/2.0
.......
Content-Type: application/play+xml
Content-Length: 126
......
<?xml version="1.0" encoding="UTF-8">
<play>
<playRequest timeout="5">
    <filter>filename="moonriver.mp3"</filter>
    <filter>target="subscriber2"</filter>
</playRequest>
</play>
```

A content type "application/play+xml" is added to the body of the SIP INFO message, and the requested content is described in XML at the end of the body. In this embodiment, terminal 1 requests the transmission of "moonriver.mp3" to "subscriber 2," i.e. terminal 2, in 5 seconds.

It is to be understood that the content type "application/play+xml" used in the SIP INFO message in this embodiment may also be "application/play+txt" or "application/play+javascript" for example. That is to say, the requested content may be described in plain text, javascript and so on.

Additionally, it is to be understood that the request of terminal 1 may be sent by means of a message of other type in addition to the SIP INFO message.

In step 202, a record for the terminal initiating the multimedia data transmission request is searched for. Specifically, upon receipt of the request from terminal 1, a record for terminal 1 is searched for in the terminal service record table as shown by Table 1. For example, the record for terminal 1 may include the address and name of terminal 1, "multimedia data transmission service" information, "receive enabled/disabled" information and so on.

In step 203, it is judged whether multimedia data transmission service has been enabled for the terminal. If yes, then the flow will go to step 204. If not, then the flow will end.

In step 204, a record for a terminal to which multimedia data is to be transmitted is searched for. In this embodiment, multimedia data will be transmitted to terminals 1 and 2, so records for terminals 1 and 2 are recorded in the terminal service record table.

In step 205, it is judged whether the "receive enabled/disabled" information in the record for the terminal has been set as "enabled." If yes, then the flow will go to step 206. If not, then the flow will end. In this embodiment, since the "receive enabled/disabled" information in the record for each of terminals 1 and 2 is set as "enabled," both of terminals 1 and 2 can receive the transmitted multimedia data. Then, the flow goes to step 206.

In step 206, the requested multimedia data is obtained according to the received multimedia data transmission request.

As described previously, prior to the implementation of the method of the present invention, multimedia data used for transmission may be provided in various manners. For example, mobile phones, personal computers, or personal digital assistants (PDAs) may provide multimedia data through HTTP, FTP, or WAP, etc.

Therefore, in step 206, the name of multimedia data to be transmitted, moonriver.mp3 for example, is obtained from the multimedia data transmission request first, then the large amount of stored multimedia data is subsequently searched for so as to obtain the requested multimedia data. If the requested multimedia data is not found, then the terminal initiating the multimedia data transmission request will be notified and the flow will end.

In step 207, the multimedia data is transmitted, while the call between the terminals is not interrupted.

At this point, multimedia data which terminal 1 wishes to transmit may be simultaneously transmitted to terminals 1 and 2 while they are in a call. Upon receipt of the multimedia data, terminals 1 and 2 can play it using their own multimedia players. In this manner, subscribers to terminals 1 and 2 can listen to a song, watch video, or appreciate pictures without affecting the normal call.

Preferably, in step 208, a multimedia data transmission stopping request is received from a terminal. The terminal requesting the stop of multimedia data transmission may be a terminal for which "receive enabled/disabled" has been enabled, a terminal that is receiving multimedia data, any one of these terminals, or even any one of terminals in the call.

For example, terminal 2 can edit, for example a SIP INFO message as illustrated below, and send it to a specific number associated with the multimedia communication device:

```
INFO sip:imsnetwork.enterprise.com:5060;user=phone SIP/2.0
......
Content-Type: application/play+xml
Content-Length: 130
......
<?xml version="1.0" encoding="UTF-8">
<play>
<playStopRequest timeout="5">
</playStopRequest>
</play>
```

In the body of the SIP INFO message, the requested content is described by XML. That is, terminal 2 requests the stop of multimedia data transmission within 5 seconds.

In step 209, multimedia communication device 3 stops transmitting multimedia data to terminals 1 and 2, and the terminals may remain in the call at the same time. When multimedia data transmission is stopped normally, a SIP 200OK message may be used to acknowledge the successful stop of multimedia data transmission. An example of a SIP 200OK message for a multimedia data transmission stopping request is illustrated below:

```
SIP/2.0 200OK
......
Content-Type: application/play+xml
Content-Length: 128
......
<?xml version="1.0" encoding="UTF-8">
<play>
<playStopRequestResult Success>
</playStopRequestResult>
</play>
```

Then, the flow ends.

MODIFICATIONS OF EMBODIMENTS OF THE PRESENT INVENTION

In step 207 of the embodiment shown in FIG. 2, the call between the terminals is not interrupted while multimedia data is being transmitted. In another embodiment of the present invention, the call between terminals 1 and 2 can be interrupted while multimedia data is being transmitted, and the call is resumed after the transmission of multimedia data ends.

In the embodiment shown in FIG. 2, if the "receive enabled/disabled" information for both terminals 1 and 2 is set as "enabled," then multimedia communication device 3 can transmit multimedia data to terminals 1 and 2 at the same time. Additionally, if the "received enabled/disabled" information for terminal 1 is set as "enabled" and that for terminal 2 is set as "disabled", multimedia communication device 3 transmits multimedia data to terminal 1 only.

In another embodiment of the present invention, both "multimedia data transmission service" and the "receive enabled/disabled" information for a terminal may be pre-set as "enabled." Therefore, in the event of default, the communication device can receive a request for multimedia data transmission from a terminal, and all terminals are allowed to receive the multimedia data.

In another embodiment of the present invention, two or more multimedia data files may be transmitted in series, in parallel or in combination thereof. For example, the picture file named "image.jpg" and the video file named "video.mpg" are transmitted while the audio file named "moonriver.mp3" is being transmitted to a terminal.

In another embodiment of the present invention, if a terminal wants to stop the current transmission of multimedia data and transmit another multimedia data, this terminal may send a multimedia data transmission switching request rather than a multimedia data transmission stopping request to multimedia communication device 3 in step 208 of the embodiment shown in FIG. 2. At this point, it is not necessary to check whether multimedia data transmission service has been enabled for the terminal sending the request or to confirm whether "receive enabled/disabled" has been enabled for the terminal to which multimedia data will be transmitted. The multimedia communication device obtains multimedia data specified in the multimedia data transmission switching request for transmission directly after stopping the current multimedia data transmission.

In another embodiment of the present invention, where a plurality of terminals are in a call, the transmission of different multimedia data for different terminals may be set in the request, so that the call becomes more customized.

Figure 3:
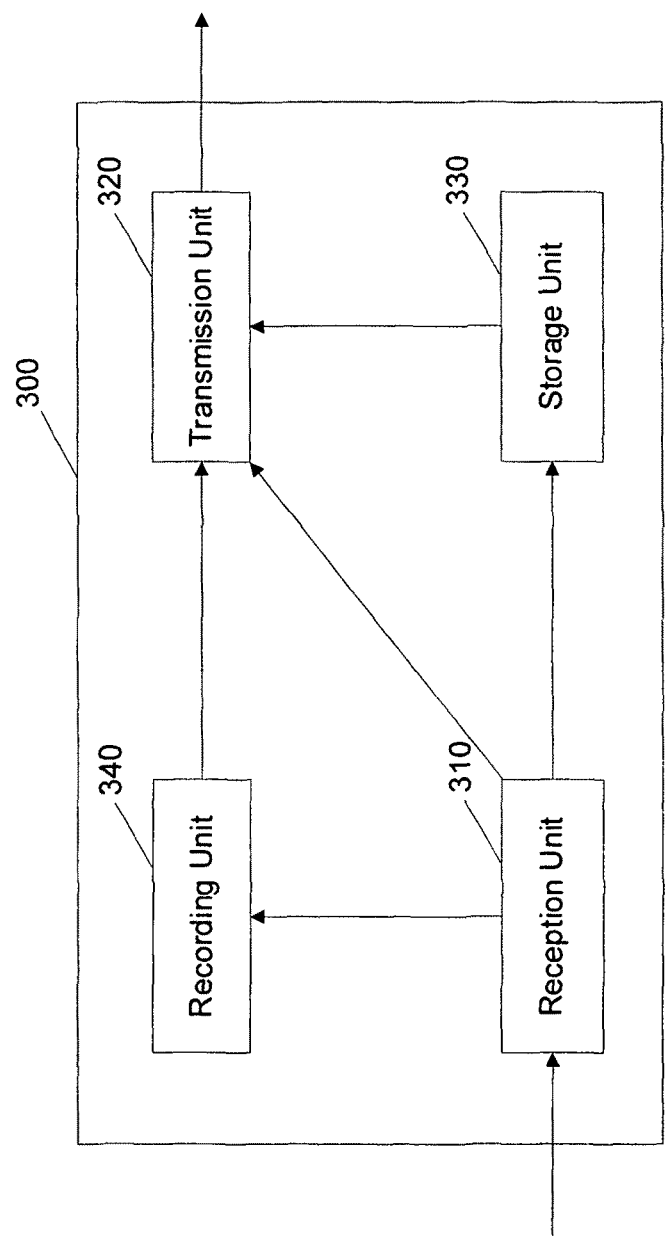
FIG. 3 is a block diagram of a communication device that transmits multimedia data during a call according to an embodiment of the present invention.

FIG. 3 is a block diagram of a communication device 300 that transmits multimedia data during a call according to an embodiment of the present invention. The communication device 300 comprises a reception unit 310 and a transmission unit 320. The communication device 300 further comprises a storage unit 330 and a recording unit 340.

As shown in FIG. 3, the reception unit 310 can receive a multimedia data transmission request initiated from one of the terminals in a call. The reception unit 310 can further receive multimedia data provided by a terminal or a service provider via, for example, HTTP, FTP, or WAP, and forward the multimedia data to the storage unit 330 for storage. The reception unit 310 can also receive a request for enabling or disabling "multimedia data transmission service" or "receive enabled/disabled" for a terminal, and forward the request for enabling to the recording unit 340.

The transmission unit 320 can obtain the requested multimedia data and transmit the multimedia data to one or more terminals in the call. Preferably, the transmission unit 320 can further comprise: means for checking whether or not multimedia data transmission service has been enabled for the terminal(s) initiating the request; means for checking whether or not the one or more terminals agree to receive the multimedia data; and means for transmitting the multimedia data to the one or more terminals, when it is determined that multimedia data transmission service has been enabled for the terminal(s) initiating the request and the one or more terminals agree to receive multimedia data.

Specifically, the transmission unit 320 can further search the recording unit 340 for a record for the terminal to which multimedia data will be transmitted and determines that "receive enabled/disabled" has been enabled for this terminal.

Further, the reception unit 310 can further comprise means for receiving a multimedia data transmission stopping request from terminal and forwards the request to the transmission unit 320; and the transmission unit 320 can further comprise means for stopping the transmission of the multimedia data to the one or more terminals based on the multimedia data transmission stopping request.

The storage unit 330 can store multimedia data that could be provided by a terminal or a service provider via, for example, HTTP, FTP, or WAP etc.

The recording unit 340 can record "multimedia data transmission service" or "receive enabled/disabled" information for a terminal. And based on a terminal's request for enabling "multimedia data transmission service" or "receive enabled/disabled", the recording unit 340 can search for the record for the terminal and record in the record that the "multimedia data transmission service" and/or the "receive enabled/disabled" information for this terminal have been set as "enabled."

It should be appreciated that various units and means of the present invention may be implemented in software, firmware, hardware or combination thereof.

It should be further appreciated that various units and means of the present invention may be on a single server, or may be disposed on different servers in a distributed manner.

It should be noted that in order to facilitate easier understanding of the present invention, the foregoing description omits more detailed technical details that are well known to those skilled in the art and might be essential to the implementation of the present invention.

The specification of the present invention has been presented for purposes of illustration and description, and is not intended to be exhaustive or limited to the invention in the form disclosed. Many modifications and variations will be apparent to those of ordinary skill in the art.

Therefore, the embodiments were chosen and described in order to best explain the principles of the invention and the practical application thereof, and to enable others of ordinary skill in the art to understand that all modifications and alterations made without departing from the spirit of the present invention fall into the protection scope of the present invention as defined in the appended claims.

What is claimed is:

1. A communication method for transmitting multimedia data during a call between terminals, comprising:
   receiving a multimedia data transmission request initiated from one of the terminals in the call;
   searching for a record of said multimedia data among records of multimedia data stored external to the terminals; and
   responsive to said request, transmitting said multimedia data to one or more of the terminals in the call when said multimedia data are located.

2. The method according to claim 1, further comprising:
   checking whether multimedia data transmission service has been enabled for the terminal initiating the request;
   checking whether said one or more terminals agree to receive the multimedia data; and
   transmitting the multimedia data to said one or more terminals, when the multimedia data transmission service has been enabled for the terminal that initiated the request and said one or more terminals agree to receive the multimedia data.

3. The method according to claim 1, wherein the call between the terminals is not interrupted while said multimedia data is being transmitted to said one or more terminals.

4. The method according to claim 1, wherein the call between said terminals is interrupted while said multimedia data is being transmitted to said one or more terminals.

5. The method according to claim 1, further comprises:
   receiving a multimedia data transmission stopping request from one terminal; and
   stopping the transmission of said multimedia data to said one or more terminals based on said multimedia data transmission stopping request.

6. The method according to claim 1, wherein said multimedia data comprises a picture file, an audio file, a video file, or combination thereof.

7. The method according to claim 1, further comprising:
   receiving the multimedia data provided by a terminal or a service provider; and
   storing said multimedia data.

8. The method according to claim 7, wherein said multimedia data is provided via one of HTTP, FTP, and WAP.

9. The method according to claim 1, wherein the terminals comprise mobile phones, personal computers, or personal digital assistants.

10. A communication device for transmitting multimedia data during a call between terminals, comprising:
    a reception unit configured to receive a multimedia data transmission request initiated from one of the terminals in the call;
    a storage unit configured to store said multimedia data, said multimedia data being stored external to the terminals; and
    a transmission unit configured to search said communication device for said multimedia data and to transmit said multimedia data to one or more of the terminals in the call.

11. The device according to claim 10, wherein said transmission unit is configured to check whether a multimedia data transmission service has been enabled for the terminal that initiated the request;
    check whether said one or more terminals agree to receive the multimedia data; and
    transmit the multimedia data to said one or more terminals when the multimedia data transmission service has been enabled for the terminal that initiated the request and said one or more terminals agree to receive the multimedia data.

12. The device according to claim 10, wherein the call between said terminals is not interrupted while said multimedia data is being transmitted to said one or more terminals.

13. The device according to claim 10, wherein the call between said terminals is interrupted while said multimedia data is being transmitted to said one or more terminals.

14. The device according to claim 10, wherein said reception unit is configured to receive a multimedia data transmission stopping request from one terminal; and
    said transmission unit is configured to stop the transmission of said multimedia data to said one or more terminals based on said multimedia data transmission stopping request.

15. The device according to claim 10, wherein said multimedia data comprises a picture file, an audio file, a video file, or a combination thereof.

\* \* \* \* \*